US009899833B2

(12) United States Patent
Box et al.

(10) Patent No.: US 9,899,833 B2
(45) Date of Patent: Feb. 20, 2018

(54) ELECTRONIC DIRECT CURRENT TRANSFORMER

(71) Applicants: Gary William Box, Golden Valley, MN (US); John Albert Perlick, Libertyville, IL (US)

(72) Inventors: Gary William Box, Golden Valley, MN (US); John Albert Perlick, Libertyville, IL (US)

(73) Assignee: Aria Controls Corporation, Golden Valley, MN (US)

(*) Notice: Subject to any disclaimer, the term of this patent is extended or adjusted under 35 U.S.C. 154(b) by 409 days.

(21) Appl. No.: 14/621,328

(22) Filed: Feb. 12, 2015

(65) Prior Publication Data
US 2016/0241025 A1    Aug. 18, 2016

(51) Int. Cl.
*H02J 1/00* (2006.01)
*H02M 3/335* (2006.01)
*H02M 3/158* (2006.01)

(52) U.S. Cl.
CPC ........... *H02J 1/00* (2013.01); *H02J 2001/002* (2013.01); *H02M 3/335* (2013.01); *H02M 2003/1586* (2013.01); *Y02B 70/1425* (2013.01); *Y02B 70/1433* (2013.01)

(58) Field of Classification Search
CPC .................................. H02J 1/00; H02J 1/102
See application file for complete search history.

(56) References Cited

U.S. PATENT DOCUMENTS

| | | | |
|---|---|---|---|
| 4,785,387 A | 11/1988 | Lee et al. | |
| 5,519,275 A | 5/1996 | Scott et al. | |
| 5,608,771 A | 3/1997 | Steigerwald et al. | |
| 5,638,260 A | 6/1997 | Bees | |
| 5,706,184 A | 1/1998 | Mizuta et al. | |
| 6,249,193 B1 | 7/2001 | Alvaro et al. | |
| 6,292,069 B1 | 9/2001 | Michaels et al. | |
| 7,054,411 B2 | 5/2006 | Katcha et al. | |
| 7,270,017 B2 | 9/2007 | Suzuki et al. | |
| 7,593,502 B2 | 9/2009 | Katcha et al. | |
| 8,581,438 B2 * | 11/2013 | Heath | H02J 1/108 307/1 |
| 8,698,351 B2 * | 4/2014 | Castelaz | H02J 4/00 307/31 |

* cited by examiner

*Primary Examiner* — Hai L Nguyen
(74) *Attorney, Agent, or Firm* — Berggren Law Offices, LLC

(57) ABSTRACT

An electronic direct current (DC) transformer apparatus and method of using it to convey unregulated off grid DC power to one or more load devices that in total use power at a level of at least 1 kW. The resonant frequency is at least 20 kHz, the unregulated energy-transfer efficiency is at least 75%, and the power distributing efficiency from source to load device is at least 75%.

20 Claims, 6 Drawing Sheets

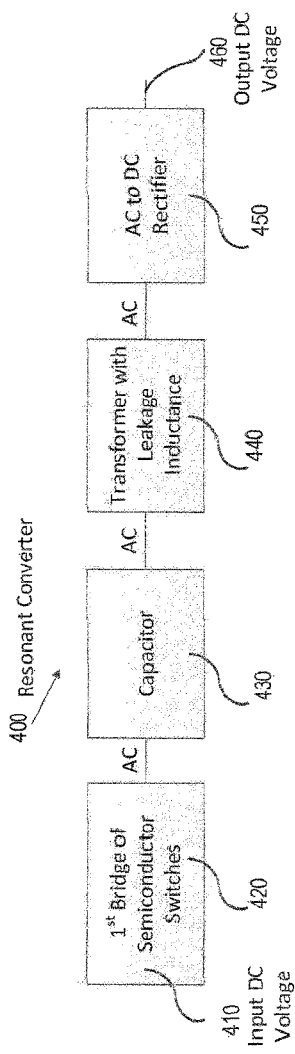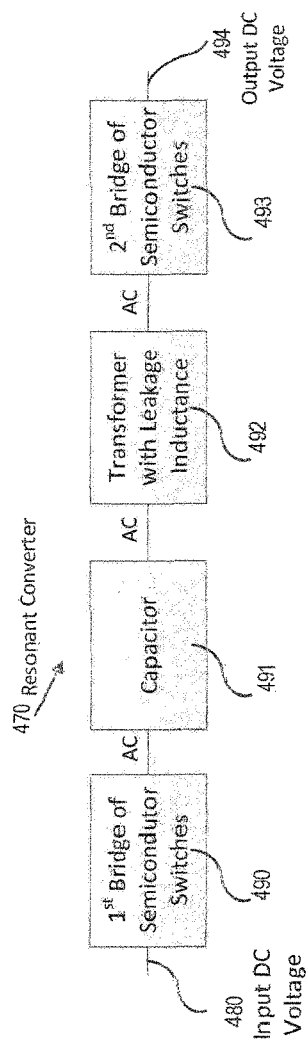

ELECTRONIC DIRECT CURRENT TRANSFORMER

FIELD OF THE INVENTION

This invention relates to the application of electronic direct current (DC) to DC converters which convert one DC voltage to a different DC voltage for the purpose of off grid power distribution to load devices.

BACKGROUND OF THE INVENTION

There is a need for an apparatus to convey off grid DC electrical power to load devices that use a combined power of at least 1 kilowatt (kW) with high distribution efficiency.

Today the use of off grid DC power is increasing. Loads that use off grid power at low power levels (from around 1 Watt (W) to 200 W) either operate at the low voltages directly from the DC sources or convert the power to other DC voltages using conversion techniques that become inefficient and impractical at power levels above 1 kW. Loads that use off grid power at high levels (over 15 kW) use sources and techniques that either do not scale to power levels below 15 kW, are expensive, or both. Loads that use off grid power at medium power levels (from 1 kW to under 15 kW) either use non electric techniques such as engine driven hydraulic systems that are pollution emitters or use low voltage techniques with low power distribution efficiencies that result in significant power loses.

There is a need for an inexpensive apparatus to convey off-grid DC electrical power to load devices that use a combined power of at least 1 kilowatt (kW) with high power distribution efficiency.

SUMMARY OF THE INVENTION

This invention addresses that need with an inexpensive, efficient electronic DC transformer apparatus able to distribute off-grid DC power with a high distribution efficiency to one or more load devices that use a combined power of at least 1 kW.

It entails two aspects, an apparatus and a method of using the apparatus. The first aspect is an electronic DC transformer apparatus that comprises two elements, an array of resonant converters and a controller. The first element, the array, is of at least two unregulated DC to DC resonant converters separated at substantially equal phase displacements. Each resonant converter comprises an alternating current (AC) transformer, a capacitor, a bridge of semiconductor switches, and a current changing device. The AC transformer includes a primary, a secondary, and a leakage inductance, and is configured to be able to communicate with a source of off grid DC power. The capacitor is in series with the AC transformer. The bridge of semiconductor switches is configured to convert DC from a DC power source to AC at near resonance of the capacitor and the AC transformer leakage inductance, and to operate at a resonant frequency of at least 20 kilo Hertz (kHz) to achieve an unregulated energy-transfer efficiency of at least 75%. The current changing device, between the AC transformer secondary and one or more load devices, is configured to convert the current between AC and DC. The array is configured to have an output power of at least 1 kW. The second element, the controller, is a single controller in communication with the array of resonant converters. It is configured to drive all resonant converters in the array at a resonant frequency that is the lowest used by any resonant converter in the array and to maintain the substantially equal phase displacements between the resonant converters. The DC power from all the converters is combined and conveyed to one or more load devices with a power distributing efficiency from the source of off grid power to the load device of at least 75%.

The second aspect is a method of using an apparatus for distributing off grid DC power to one or more load devices that comprises five steps. The first step is providing a source of DC off grid power. The second step is providing the electronic DC transformer apparatus described above for distributing off grid DC power to one or more load devices. The third step is providing DC power to one or more load devices of a total of at least 1 kW. The fourth step is placing the apparatus in communication with the source of off grid DC power and one or more load device. The fifth step is activating the apparatus when the load device needs off grid power.

Benefits of the invention are several. In general it is an apparatus and method to supply DC from sources of off grid power to one or more off grid load devices with an easy to maintain electrical system that has a distribution efficiency of at least 75%. Thus it is an improvement over off-grid systems that use expensive to install and maintain hydraulic or mechanical systems that are powered by internal combustion engines that generate undesired emissions as they idle between times of use. Specifically, it has at least six advantages over electrical systems currently known or in use to supply off-grid DC power to load devices using power at a level of at least one kilowatt (kW). First, the invention obtains a higher system efficiency than currently attainable by decoupling the DC source voltage from the DC load voltage permitting each to be independently optimized. Second, it eliminates the energy loss of long, high power, low voltage DC distribution systems. Third, it maintains cycle by cycle control of power transfer at a high frequency providing protection response times previously unattainable. Fourth, it eliminates the unnecessary losses from DC to AC and back to DC steps of present technology. Fifth, various embodiments have power distribution efficiencies of at 75%, 80%, 85%, 90%, and 95%. In addition, some embodiments also allow the recovery of energy from load devices operating in a power generating mode. It is also an efficient easy to maintain way to supply backup power to such grid devices such as traffic lights and electronic signs when the grid is interrupted.

BRIEF DESCRIPTION OF THE DRAWINGS

FIG. 4A is a diagram of an embodiment of a resonant converter of the electronic DC transformer of the invention to convert off grid DC power to a load using a DC power at a higher voltage.

FIG. 4B is a diagram of an embodiment of a resonant converter of the electronic DC transformer of the invention to convert off grid DC power to a load using a DC power at a higher voltage or convert power from the load device to a source of off grid DC power.

Figure 1:
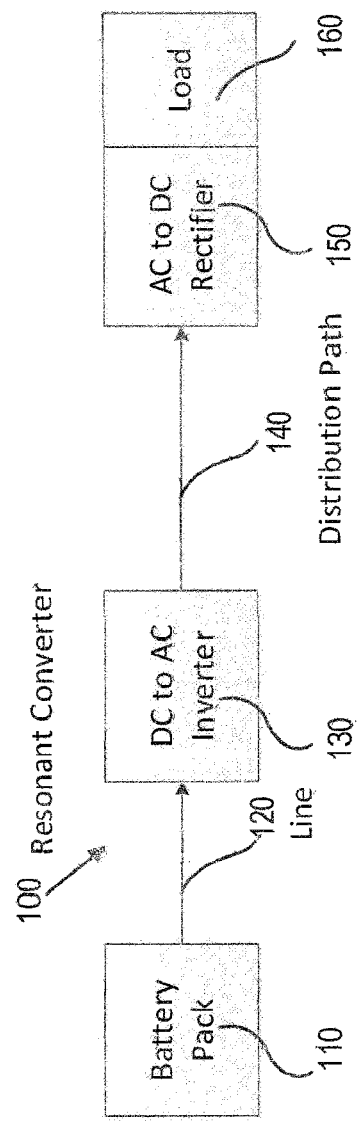
FIG. 1 is a block diagram of the elements of a typical prior art system to convert off grid DC power to a load using a DC power at a higher voltage.

While the invention is amenable to various modifications and alternative forms, specifics have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

The invention is an electronic DC transformer apparatus able to distribute off grid, unregulated, DC power with a distribution efficiency of over 75% to one or more load devices that use a combined power of at least 1 kW. Such an electrical distribution system does not leak like power distribution systems that use hydraulics, consume little or no power at idle like those that use an internal combustion engine (ICE), and is easily installed, modified and maintained. Electrical power distribution expense and efficiency is dominated by current and frequency related losses. The greater distribution efficiencies of the invention is achieved by raising the operating voltage from that typically of batteries to that typically of a load, minimizing the current distributed to the load, and operating at near the resonant frequency of a high frequency transformer. In general, the apparatus of the invention enables the DC source; the DC distribution system and the DC loads to all operate at different, optimal voltages to provide maximum system efficiency while itself operating at maximum efficiency enabling the use of high voltage DC nano grids to replace low voltage DC, hydraulic, pneumatic and mechanically linked systems improving energy efficiency, eliminating emissions and lowering operating noise levels.

The invention is most beneficial when operated to distribute a combined load of at least 1 kW and below 15 kW. While the invention works to supply distribution loads below 1 kW and above 15 kW, other factors arise that make other distribution systems more relevant at these loads. Below 1 kW single transformer techniques such as full bridge square wave converters and other switching power techniques are practical and common. While both power conversion and power distribution efficiencies are not as high as those of the invention, the power consumptions are so low that the amount of the loss is tolerable from a cost perspective. Above 1 kW such techniques suffer from the effects of parasitics such as stray capacitance and leakage inductance, causing inefficiency and increased electromagnetic interference. The invention uses these parasitics to improve efficiency and the cost benefit becomes significant above 1 kW. At power levels above 15 kW for stationary applications, other generation and storage technologies such as fuel cells and flywheels become practical to provide high voltage DC power. For mobile applications, light weight, high energy density battery technologies, connected in series, can provide high voltage DC power, but they are complex and expensive.

Currently, off grid systems with loads of between 1 kW and 15 kW use low voltage DC distribution or hydraulic power distribution that are less suitable than the invention. Off grid systems such as lift gates on trucks or winches on trucks or marine applications presently use a distribution system of low voltage DC from batteries, through sometimes long lengths of large gauge wire, to power inefficient low voltage DC motors. Typically, such systems operate in short bursts drawing high currents and exhibiting system distribution efficiencies as low as 40%. By locating the apparatus of the invention near the batteries, the low battery DC voltage, V, is converted to a high unregulated DC voltage n times V, the distributed current is reduced from I to I divided by n and distribution losses are reduced by as much as 90% in some embodiment of the invention. The higher voltage and lower current DC at the load enables the use of higher efficiency DC motors such as, induction motors or permanent magnet synchronous motors that can be connected to conventional motor drives; an alternative that is currently not possible. System efficiency, i.e., power distributing efficiency from the source of off grid power to the load device, is increased to at least 75%. Because the invention is unregulated and has no feedback loops to limit response time, it can provide burst power with no risk of instability. Furthermore, the low current and high voltage of the DC distribution system can be distributed easily to other loads such as additional winches, lift gates, motion systems, material handling devices and electronic loads in a high voltage DC nano grid, which is impractical with existing low voltage systems.

Others use ICEs power sources. Off grid systems such as bucket trucks, and snowplow attachments, use ICEs, either independently or through a mechanical power takeoff, driving hydraulic pumps or pneumatic compressors, which in turn drive hydraulic or pneumatic cylinders and motors. Still others such as leaf blowers use direct mechanical links. These systems also operate in short, high power bursts, but the ICE must run continuously to maintain pressure or motion. In the case of hydraulics, the pump also must run continuously. This constant idling wastes energy, and produces both emissions, and noise levels that are increasingly subject to legislated limits. Furthermore, ICE powered equipment is not allowed in confined spaces such as indoors and is not preferred in remote locations where ICE maintenance or reliability may be a problem. A change to (1) rechargeable batteries with the apparatus of the invention attached to produce a high, unregulated DC voltage, and (2) electrically driven actuators with their own controllers such as motors and electrically powered hydraulic cylinders, would enable these systems to consume little or no power at idle, run silently, and produce no emissions.

Still another off grid distribution system is a rechargeable battery application to provide backup power in the event of the loss of grid power. Currently, the battery low voltage is fed in these applications to a DC to AC inverter that outputs a high voltage sine wave mimicking the grid. Many of the loads fed by the inverter have electronic controllers of their own which convert the AC sine wave from the inverter back to DC to supply the load. This conversion from DC to AC and back to DC is eliminated in the invention and associated inefficiencies with this operation are eliminates. Furthermore, the DC to AC inverter has circuits and control loops to regulate output voltage and shape. High efficiency loads such as switching power supplies and motor controllers can present a negative impedance to the DC to AC inverter, developing instabilities. By attaching an embodiment of the apparatus of the invention to the low voltage batteries in a system that has loads that can accept DC, both the DC to AC conversion and AC to DC conversion steps can be eliminated, improving efficiency, reducing complexity and cost, and eliminating possible instability.

Significantly greater distribution efficiency is highly desirable in an off grid application particularly if it is battery powered. All battery voltages are limited to a multiple of the discrete voltage of a single battery cell, although the cell voltage is different between different battery chemistries. Single cells can be connected in series to produce the high voltage necessary for efficient power distribution, but this creates significant challenges to the construction of the battery pack, such as guaranteeing the equal charging of each cell or providing for the failure of a single cell. A parallel connection of the batteries, however, allows for naturally equalized charging and cell failure can be accommodated with a simple fuse. Thus the optimum battery pack for an off grid application would provide low voltage, high current electrical power.

Electric off grid applications must also operate at highest efficiency. Some may use battery banks with alternative energy charging methods such as wind or solar. The optimum, and most efficient source DC voltage of these applications depends on the nature of the battery and charging technology used. Meanwhile, the optimum and most efficient voltage for distributing the energy to the load and/or loads may be different. For example, a lift gate on a large truck may use 12 VDC to power a hydraulic pump in the back of the truck. The total distribution path may be 80 feet or more and the motor may be an inefficient DC brush motor. A more efficient system would convert the 12 VDC to 400 VDC, distribute the 400 VDC to the lift gate, and use a variable frequency drive and an induction motor to power the hydraulic pump. The 400 VDC system would have 90% less distribution loss, longer run time from a battery, and a more efficient, smaller, more controllable and more reliable motor.

FIG. 1 is a block diagram of the elements of a typical prior art electronic system to convert off grid unregulated low voltage DC power such as a battery to a load such as a motor using a DC power at a higher voltage. A system (100) comprises a low voltage battery bank (110), a load (160), and elements between that convert unregulated off grid low voltage to high voltage required by load 160. Low voltage battery bank 110 is attached by a line (120) carrying low voltage high current unregulated off grid DC to a DC to AC Inverter (130). A high voltage sine wave passes on a long distribution path (140) to an AC to DC Rectifier (150) run at low frequency and attached to a load (160). Overall efficiency of this system is less than with the electronic DC transformer of the invention.

Figure 2:
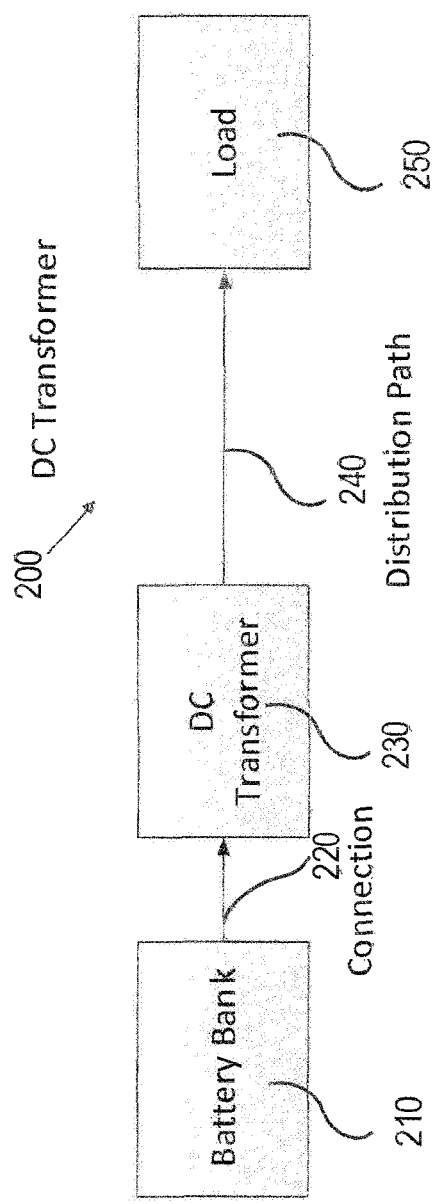
FIG. 2 is a block diagram of the elements of an embodiment of the invention to convert off grid DC power to a load device using a DC power at a higher voltage.

Unregulated DC conversion is sufficient to satisfy the requirement of the above systems, is more stable, and, since it involves the minimum of current handling components, is inherently more efficient than either regulated or sine wave inverter options. As mentioned above, the invention is an electronic DC transformer that is a high efficiency, scalable technology to convert the optimum DC voltage of the source to the optimum DC voltage of the load. FIG. 2 is a block diagram of a system using an embodiment of the invention to convert unregulated off grid DC power to a high voltage required by the load. In FIG. 2, a system (200) comprises is a low voltage battery bank (210), and a load (250) and the invention in between. Low voltage battery bank 210 through connection (220) is connected to an electronic DC transformer (230) that is, in turn, connected to possibly a long distribution path (240) carrying high voltage DC at a low current to load 250. There is little if any negative impact on the distribution efficiency by the length of distribution path 220 because the current is low.

The electronic DC transformer invention has two aspects, an apparatus and a method. The first aspect is an electronic DC transformer apparatus that comprises two elements, an array of resonant converters and a controller. The first element, the array, is of at least two unregulated DC to DC resonant converters separated at substantially equal phase displacements. Each resonant converter comprises an alternating current (AC) transformer, a capacitor, a bridge of semiconductor switches, and a current changing device. The AC transformer includes a primary, a secondary, and a leakage inductance, and is configured to be able to communicate with a source of off grid DC power. The capacitor is in series with either the primary or the secondary of the transformer. The bridge of semiconductor switches is configured to convert between DC from a DC power source and AC at near resonance of the capacitor and the AC transformer leakage inductance, and to operate at a resonant frequency of at least 20 kilo Hertz (kHz) to achieve an unregulated energy-transfer efficiency of at least 75%. The current changing device, between the AC transformer secondary and one or more load devices, is configured to convert the current between AC and DC. The array is configured to have an output power of at least 1 kW. The second element, the controller, is a single controller in communication with the array of resonant converters. It is configured to drive all resonant converters in the array at a resonant frequency that is the lowest used by any resonant converter in the array and to maintain a substantially equal phase displacement between them. The outputs of all the resonant converters are combined to convey DC power to one or more load devices with a power distributing efficiency from the source of off grid power to the load device of at least 75%.

The controller may have various forms. In some embodiments, the controller is a microcontroller. In some embodiments, the controller is an application specific integrated circuit. In some embodiments, the controller is a programmable logic device.

Figure 3:
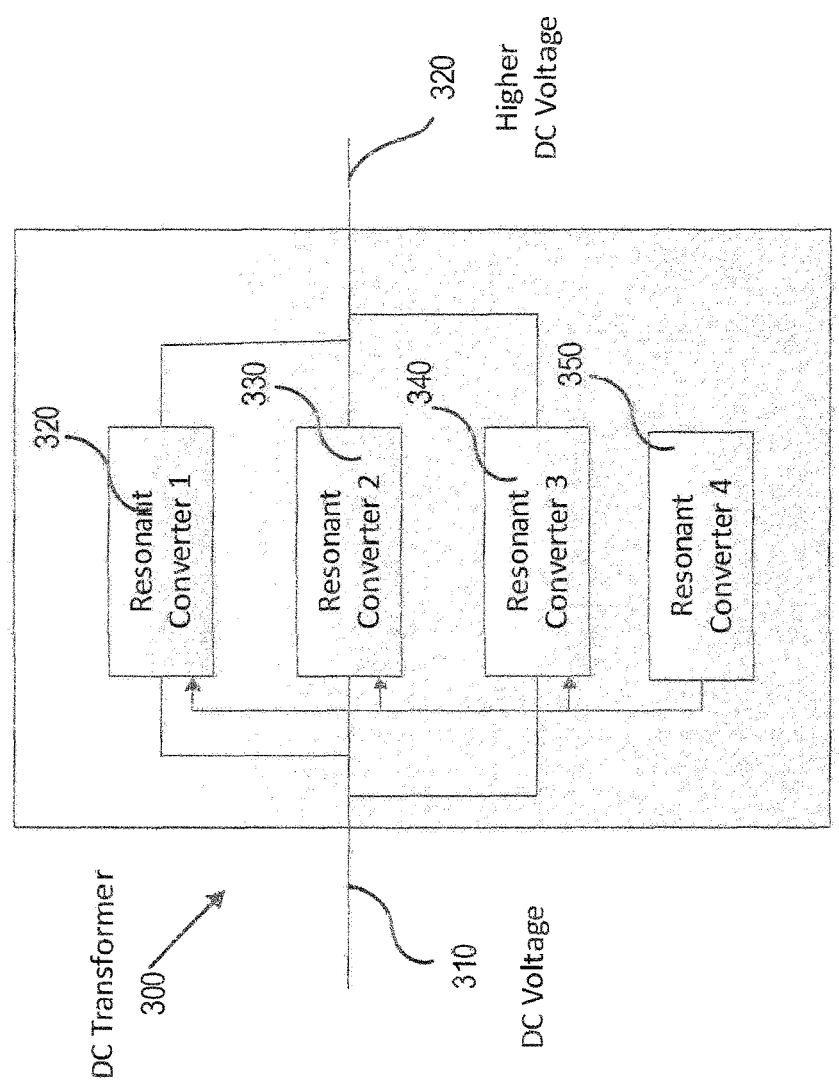
FIG. 3 is a block diagram of the elements of an embodiment of the electronic DC transformer of the invention.

The electronic DC transformer invention provides efficient, unregulated conversion of direct current at voltage, X, to a direct current at a different voltage, n times X, for the purpose of high efficiency power distribution or voltage matching and achieves the conversion using two or more full resonant converters operating in parallel at the same frequency but shifted in phase. FIG. 3 is a block diagram of the elements of an embodiment of the invention to either convert off grid DC power to a load using a DC power at a higher voltage or convert power from the load device to a source of off grid DC power. In one embodiment of the invention, the current changing device is a secondary rectifier. This drives the current in only one direction, toward the load. In another embodiment of the invention, the current changing device is a second bridge of semiconductor switches configured to either synchronously rectify the AC waveform in the forward direction from the secondary of each of the resonant converter transformers or drive the power from the load in the reverse direction from the secondary to the primary of each resonant converter transformer to the source of off-grid DC power. In this latter case, the second bridge of semiconductor switches converts DC current from the load to AC current and the first bridge of semiconductor switches performs as a synchronous rectifier.

FIG. 3 is a block diagram of the elements of an embodiment of the invention to either convert off grid DC power to a load using a DC power at a higher voltage or convert power from the load device to a source of off grid DC power. FIG. 3 illustrates an electronic DC transformer (300) comprising a DC input voltage source (310) attached in parallel to a series of three resonant converters (320, 330, and 340) equally out of phase and all attached to a single controller (350). All are attached with a higher DC voltage (360) to a load.

FIG. 4A is a diagram of an embodiment of the resonant converter of the DC transformer of the invention. FIG. 4A illustrates a resonant converter system (400) comprising a DC input voltage source (410) attached to a first bridge of semiconductor switches (420) that acts as a current changer switch to change current between DC and AC. First bridge of semiconductor switches 420 is attached to a capacitor (430) and a transformer with a leakage inductance (440), where the order of capacitor 430 and transformer with a leakage inductance 440 can be reversed so that transformer with a leakage inductance 440 is between first bridge of semiconductor switches 420 and capacitor 430. Transformer with a leakage inductance 440 is connected to a rectifier (450), a current changing device, that is in turn connected to a high voltage DC line (460) of suitable voltage for a load.

FIG. 4B is a diagram of an embodiment of the resonant converter of the DC transformer of the invention. FIG. 4B illustrates a resonant converter system (470) comprising a DC input voltage source (480) attached to a first bridge of semiconductor switches (490) that acts as a current changer switch to change current between DC and AC. First bridge of semiconductor switches 490 is attached to a capacitor (491) and a transformer with a leakage inductance (440), where the order of capacitor 491 and transformer with a leakage inductance 492 can be reversed so that transformer with a leakage inductance 492 is between first bridge of semiconductor switches 490 and capacitor 491. Transformer with a leakage inductance 492 is connected to a second semiconductor bridge (493), a current changing device, that is in turn connected to a high voltage DC line (494) of suitable voltage for a load. In some embodiments, such as a lift truck lowering its bucket the load may generate energy that may be passed to the source through an electronic DC transformer containing the resonant converters as described in FIG. 4B.

The invention is able to achieve unregulated energy-transfer efficiencies and power distributing efficiencies from the source of off grid power to the load device that are superior to that currently known. This is particularly true when the resonant frequency is at least 50 kHz. Some embodiments have an unregulated energy-transfer efficiency of at least 80%, some at least 85%, some at least 90% and some at least 95%. Some embodiments have a power distributing efficiencies from the source of off grid power to the load device that is of at least 80%, some at least 85%, some at least 90% and some at least 95%.

The second aspect of the invention is the method of using an apparatus for distributing off grid DC power to one or more load devices that comprises five steps. The first step is providing a source of DC off grid power. The second step is providing the electronic DC transformer apparatus described above for distributing off grid DC power to one or more load devices. The third step is providing DC power to one or more load devices of a total of at least 1 kW. The fourth step is placing the apparatus in communication with the source of off grid DC power and one or more load device. The fifth step is activating the apparatus when the load device needs off grid power.

The apparatus is useful in a variety of current or potential off grid unregulated power applications. Several are listed here as an illustration of the breath of benefit. Applications that benefit from relying on batteries as a source of stored unregulated off grid DC power would benefit by either longer battery life or need for smaller batteries. Applications that rely on hydraulic devices powered by batteries or ICE generators to supply power may now use electric motors and electronic DC transformers with the batteries, a system that inherently has higher efficiency, and lower installation and maintenance costs. On grid regulated systems such as traffic lights may now be backed up economically with off grid unregulated DC power supplies by use of an embodiment of the more efficient electronic DC transformer apparatus of the invention. With some embodiments of the invention, construction equipment powered by 1 to 15 kW DC power, such as, for example, industrial sanders and painting machines, can now be powered by batteries where generators were not able to be used before and batteries did not supply reliable power either at all or for a satisfactory amount of time such as, for example, constructing the interior of the $14^{th}$ floor of a building.

By providing a means to match an optimized power source to an optimized load, embodiments of the invention can be a key component in the building of DC microgrids that are either stationary or mobile. A DC microgrid can be as small as a single load or as large as a community. Some examples include the following to illustrate the concept.

One microgrid is for off grid construction equipment. Many larger construction tools such as saws and drills require burst power in the 1 Kw to 15 Kw range, which is currently provided by generators when the grid is not available. Many new versions of this equipment have electronic controls and will operate from DC. Using the apparatus of the invention with one or more appropriately sized low voltage power source such as a rechargeable battery would enable the use of this equipment off grid in indoor, emission sensitive or noise sensitive locations. Alternative energy sources such as solar and wind could provide the energy, powering construction in remote areas without refueling.

Another microgrid application is for remote and robotic agricultural equipment. Autonomous vehicles are being developed for agriculture. As the system power requirements of these vehicles increases, there will be a requirement for light, efficient energy distribution that a distributed high voltage DC system can meet using an embodiment of the electronic DC transformer of the invention to convert from one DC voltage level to another, as required. For remote applications, such as powering an array of equipment to manage a remote hydroponic facility, an embodiment of the electronic DC transformer of the invention would enable implementation of an efficient high voltage DC microgrid powered from alternative energy with battery backup.

Another DC microgrid application is for autonomous aircraft. As autonomous aircraft develop and take on heavier payloads, it will become vital for on board power distribution to be as light and efficient as possible. Hydraulics will not be an option. An electronic DC transformer embodiment of the invention incorporated in an on board high voltage DC microgrid can minimize weight and maximize system efficiency.

Still another microgrid application is for community DC microgrids. Equipment already exists today that is capable of using high voltage DC to provide light, motion, heating, cooling, communications, control, monitoring, and entertainment. An electronic DC transformer embodiment of the invention can be used in a high voltage DC microgrid to convert voltage as needed to power any combination of these elements. Such a DC microgrid system may be connected to the grid, with the apparatus of the invention providing back up power, or be completely remote, which may prove particularly useful in developing countries.

Figure 5:
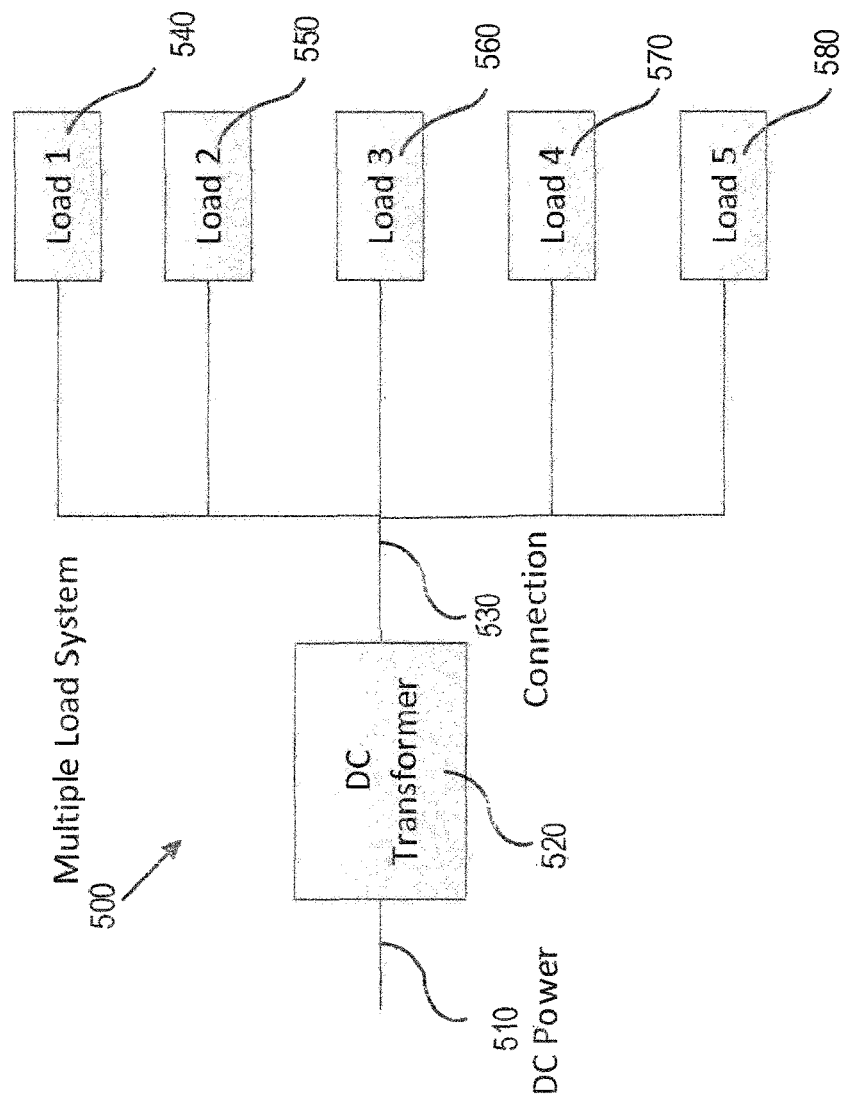
FIG. 5 is a block diagram of an embodiment of the invention supplying DC power to more than one load device.

FIG. 5 is a block diagram of an embodiment of the invention supplying DC power to more than one load device. FIG. 5 illustrates a multiple load system (500) comprising a source line of low voltage unregulated off grid DC power (510) connected to an electronic DC transformer (520) and then through a connection (530) to five loads (540, 550, 560, 570, and 580) in parallel.

Figure 6:
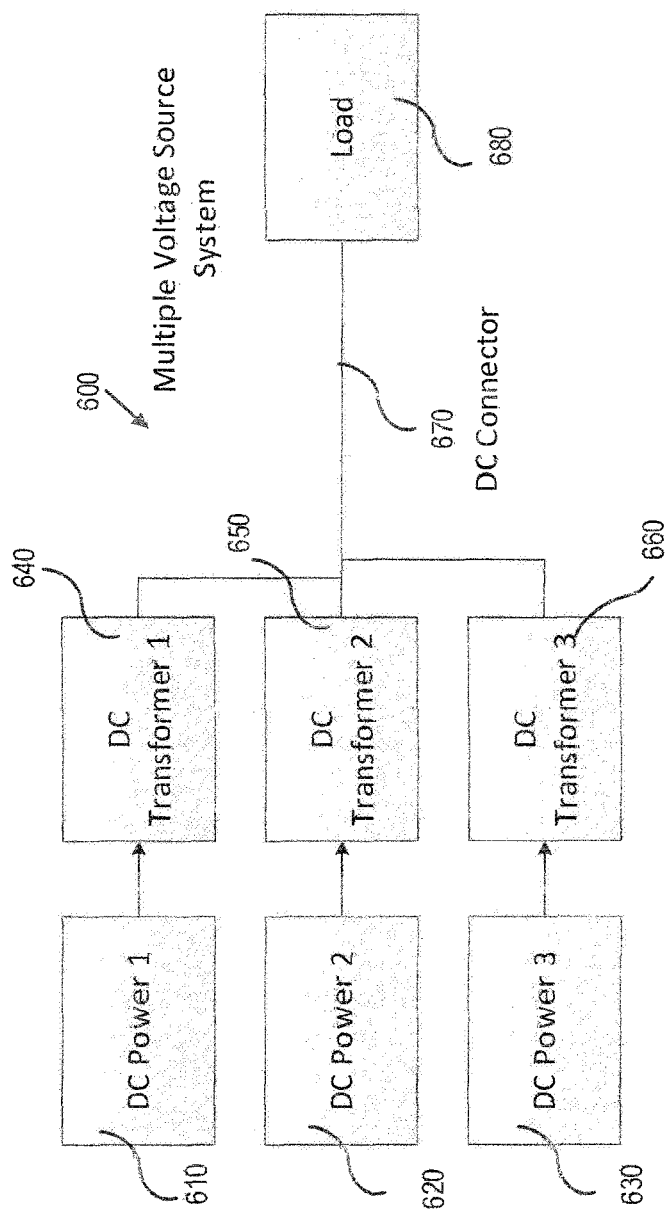
FIG. 6 is a block diagram of an embodiment of the invention receiving off grid DC power from more than one source of power.

FIG. 6 is a block diagram of an embodiment of the invention receiving off grid DC power from more than one source of power. FIG. 6 illustrates a multiple voltage source system (600) comprising a three source line of low voltage unregulated off grid DC power (610, 620, and 630) each connected to an electronic DC transformer (640, 650, and 660) and then through a high voltage DC connection (670) to a load (680).

Other modifications and changes made to fit particular operating requirements and environments will be apparent to those with ordinary skill in the art. Thus, the invention is not considered limited to the embodiments discussed for purposes of disclosure and covers all changes and modifications that do not constitute departures from the true spirit and scope of this invention.

The invention claimed is:

1. An electronic direct current (DC) transformer apparatus for distributing off grid (DC power to one or more load devices, comprising:
   a. an array of at least two unregulated DC to DC resonant converters separated at substantially equal phase displacements, each comprising:
      i. an AC transformer with a primary, a secondary, and a leakage inductance and configured to be able to communicate with a source of off grid DC power,
      ii. a capacitor in series with the AC transformer,
      iii. a bridge of semiconductor switches configured to convert DC from a DC power source to AC at near resonance of the capacitor and the AC transformer leakage inductance, and to operate at a resonant frequency of at least 20 kilo Hertz (kHz) to achieve an unregulated energy-transfer efficiency of at least 75%, and
      iv. a current changing device between the AC transformer secondary and one or more load devices and configured to convert the current between AC and DC, and
   b. a single controller in communication with the array of resonant converters and configured to drive all resonant converters in the array at a resonant frequency that is the lowest used by any resonant converter in the array, to maintain substantially equal phase displacement between the resonant converters, and to convey DC power to one or more load devices with a power distributing efficiency from the source of off grid power to the load devices of at least 75%.

2. The apparatus of claim 1 wherein the resonant frequency is at least 50 kHz.

3. The apparatus of claim 1 wherein the unregulated energy-transfer efficiency is at least 85%.

4. The apparatus of claim 1 wherein the unregulated energy-transfer efficiency is at least 90%.

5. The apparatus of claim 1 wherein the unregulated energy-transfer efficiency is at least 95%.

6. The apparatus of claim 1 wherein the current changing device is a secondary rectifier.

7. The apparatus of claim 1 wherein the current changing device is a bridge of semiconductor switches configured to either synchronously rectify the AC waveform in the forward direction from the secondary of each of the resonant converter transformers or drive the power from the load in the reverse direction from the secondary to the primary of each resonant converter transformer to the source of off-grid DC power.

8. The apparatus of claim 1 wherein the controller is a microcontroller, an application specific integrated circuit, or a programmable logic device.

9. The apparatus of claim 1 wherein the distributing efficiency is at least 85%.

10. The apparatus of claim 1 wherein the distributing efficiency is at least 90%.

11. The apparatus of claim 1 wherein the distributing efficiency is at least 95%.

12. The apparatus of claim 1 wherein the array is configured to have an output power of at least one kilowatt (kW) and no more than fifteen kW.

13. The apparatus of claim 1 wherein the array is configured to have an output power of at least one kilowatt (kW) and no more than ten kW.

14. A method of using an apparatus for distributing off grid DC power to one or more load devices, comprising the steps of:
   a. providing a source of DC off grid power,
   b. providing an electronic DC transformer apparatus for distributing off grid DC power to one or more load devices, comprising:
      i. an array of at least two unregulated DC to DC resonant converters separated at substantially equal phase displacements, each comprising:
         (a). an AC transformer with a primary, a secondary, and a leakage inductance, and configured to be in communication with a source of off grid DC power,
         (b). a capacitor in series with the AC transformer,
         (c). a bridge of semiconductor switches configured to convert the DC from an off grid power source to AC at near resonance of the capacitor and the AC transformer leakage inductance, and to operate at a resonant frequency of at least 20 kilo Hertz (kHz) to achieve a unregulated energy-transfer efficiency of at least 75%, and
         (d). a current changing device between the AC transformer secondary and one or more load devices and configured to convert the current between AC and DC,
      wherein the array is configured to have an output power of at least one kilowatt (kW), and
      ii. a single controller in communication with the resonant converters and configured to drive all resonant converters in the array at a resonant frequency that is the lowest used by any resonant converter in the array, to maintain a substantially equal phase displacement between the resonant converters, and to convey DC power to one or more load devices with a power distributing efficiency from the source of off grid DC power to the load-powered device of at least 75%,
   c. providing DC power to one or more load devices of a total of at least 1 kW,
   d. placing the apparatus in communication with the source of off grid DC power and one or more load device, and
   e. activating the apparatus when the load device needs off grid power.

15. The method of claim 14 wherein apparatus is part of the load device.

16. The method of claim 14 wherein the apparatus is part of the source of off grid power.

17. The method of claim 14 wherein the current changing device of the apparatus is a bridge of semi-conductor switches configured to drive the power in the reverse direction from the secondary to the primary and the method, further comprises the step of:
  f. storing power in the source of off grid power while the load-powered device is providing energy instead of consuming off-grid power.

18. The method of claim 14 wherein the resonant frequency is at least 50 kHz.

19. The method of claim 14 wherein the unregulated energy-transfer efficiency is at least 90%.

20. The method of claim 14 wherein the distributing efficiency is at least 90%.

* * * * *